No. 11,876. Reissued Dec. 4, 1900.
J. KERR.
TWO-NEEDLE SEWING MACHINE.
(Application filed Jan. 18, 1900.)
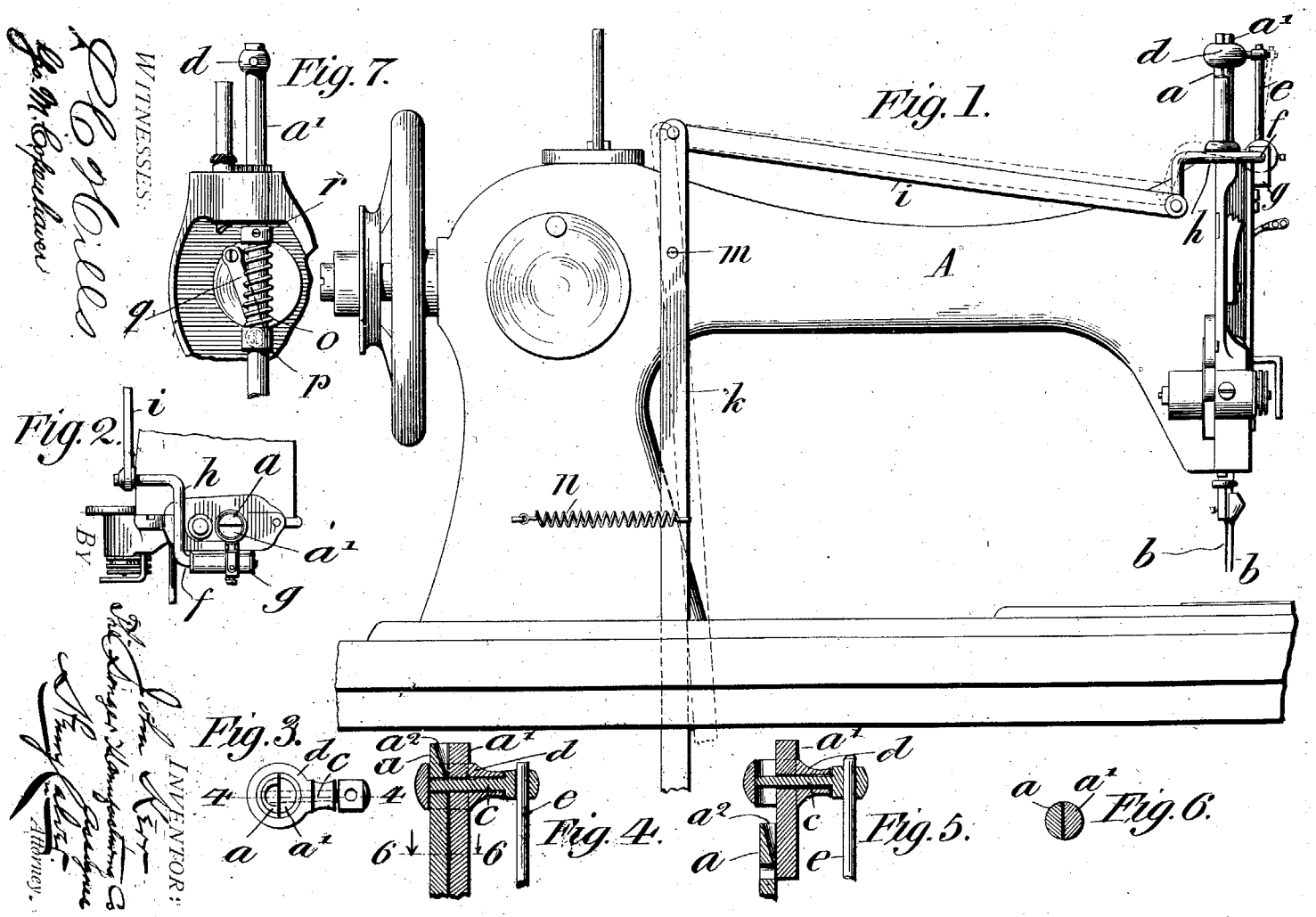
WITNESSES:
L. C. Hills
Geo. M. Copenhaver
INVENTOR:
John Kerr
The Singer Manufacturing Co.
Assignee
BY
Henry Calvert
Attorney.

UNITED STATES PATENT OFFICE.

JOHN KERR, OF DAYTON, KENTUCKY, ASSIGNOR TO THE SINGER MANUFACTURING COMPANY, OF NEW JERSEY.

TWO-NEEDLE SEWING-MACHINE.

SPECIFICATION forming part of Reissued Letters Patent No. 11,876, dated December 4, 1900.

Original No. 598,346, dated February 1, 1898. Application for reissue filed January 18, 1900. Serial No. 1,923.

*To all whom it may concern:*

Be it known that I, JOHN KERR, a citizen of the United States, residing at Dayton, in the county of Campbell and State of Kentucky, have invented certain new and useful Improvements in Two-Needle Sewing-Machines, of which the following is a specification, reference being had therein to the accompanying drawings.

My invention has for its object to provide means of simple construction whereby one of the needles of a two-needle sewing-machine may be thrown into or out of operation without stopping the machine, it being frequently desirable with this class of machines to suspend the operation of one of the needles for a few stitches, as in turning square corners.

In the drawings, Figure 1 is a rear side elevation of one form of a Singer sewing-machine embodying my invention, and Fig. 2 is a partial plan view of the head of the same. Figs. 3, 4, 5, and 6 are detail views of the upper parts of the two needle-bars and their connections, and Fig. 7 is a partial front view of the head with the face-plate removed.

In the form of my invention herein shown the contiguously-placed needle-bars $a$ $a'$, each carrying a needle $b$, are made as half-round bars, so as to reciprocate in the usual round bearings in the head at the forward end of the arm A, the needle-bar $a$ being connected in the usual manner to the crank at the forward end of the driving-shaft journaled in the upper part of said arm. The needle-bar $a'$ is coupled to the bar $a$ by a pin $c$, free to slide horizontally in a collar $d$, brazed or otherwise rigidly secured to the bar $a'$ at or near the top thereof. The head of the pin $c$ has an aperture, through which freely passes a rod or arm $e$ of a small rock-shaft $f$, journaled in a block $g$ and having a second arm $h$, joined by a connecting-rod $i$ to a lever $k$, pivoted at $m$ and extending down through the work-plate B, so as to be operated from beneath said work-plate by any suitable treadle or knee-lever connections.

A spring $n$, attached to the standard of the arm A and to the lever $k$, below the fulcrum of the latter, presses the upper end of said lever forward, and thus normally, through the rod $i$, arm $h$, rock-shaft $f$, and arm $e$, holds the coupling-pin $c$ in connection with the main needle-bar $a$, so that the auxiliary needle-bar $a'$ will be caused to reciprocate vertically with the main needle-bar owing to this coupled connection of the two bars, the head of the pin $c$ at such times reciprocating freely on the rod or arm $e$, passing loosely through the hole in said head.

When it is desired to throw the auxiliary needle-bar $a'$ out of operation, the attendant moves the lower end of the lever $k$ forward or in opposition to the stress of the spring $n$, thus throwing the upper end of the rod or arm $e$ outward far enough so that when the needle-bars are at the top of their stroke the coupling-pin will be withdrawn from the main needle-bar, which latter will continue to reciprocate, while the auxiliary needle-bar, being now disconnected from its means of operation, will remain at rest, being retained in its raised position by a spring $o$, interposed between a collar $p$, attached to the main needle-bar $a$, and a collar $r$, fast on the auxiliary needle-bar $a'$, the operating-pitman $q$ for the said main needle-bar $a$ being connected with said collar $p$. The dotted lines in Fig. 1 denote the position of the parts when the needle-bars are disconnected from each other. When the auxiliary needle-bar $a'$ is again to be set into operation, the lever $k$ is released and is restored to its normal position by the spring $n$, and the coupling-pin $c$ is thus pressed inward, so that as the main needle-bar $a$ rises said pin rides over an interior incline $a^2$ of the said bar $a$ and then snaps into its coupling-hole in said bar when the latter reaches the top of its upstroke.

It will thus be understood that by means of the devices herein described the auxiliary needle-bar may be thrown into or out of operation without stopping the machine, so that in turning corners, where it is desirable to shorten one row of stitches, this may be done without delay or trouble, the attendant controlling the action of the auxiliary needle-bar by a knee-lever or treadle, leaving the hands free to manipulate the work.

Having thus described my invention, I claim and desire to secure by Letters Patent—

1. In a sewing-machine, the combination with the needle-bars $a$ and $a'$, of the coupling-pin $c$, the rock-shaft $f$ having the arm $e$, engaging said coupling-pin, and the arm $h$, the lever $k$, its controlling-spring $n$ and the rod $i$ connecting said lever with said arm $h$.

2. In a sewing-machine, the combination with the two contiguously-placed needle-bars $a$ and $a'$, the former having the incline $a^2$, of the coupling-pin $c$, means for yieldingly pressing said pin toward said incline and means for withdrawing said pin when the auxiliary needle-bar $a'$ is to be uncoupled from the main needle-bar $a$.

3. In a sewing-machine, the combination with the two contiguously-placed needle-bars $a$ and $a'$, the former having the incline $a^2$, of the coupling-pin $c$, the rock-shaft $f$ having the arm $e$, engaging said coupling-pin, and the arm $h$, the spring-actuated lever $k$, the rod $i$ connecting said lever with said arm $h$, and a spring for holding said needle-bar $a'$ in an elevated position when said coupling-pin is withdrawn from said bar $a$.

4. In a sewing-machine, the combination with a main needle-bar, of an auxiliary needle-bar, a coupling device, carried by said auxiliary needle-bar, for connecting one of said needle-bars to the other, an actuating-lever, and connections between said lever and said coupling device whereby the latter may be actuated to connect or disconnect said needle-bars without stopping the machine.

5. In a sewing-machine, the combination with main and auxiliary needle-bars, and means, connected to one of said bars, for operating it, of a coupling device carried by one of said bars and independent of said operating means and serving to connect said bars together when desired, an actuating-lever, and connections between said lever and coupling device whereby the latter may be operated to connect and disconnect said needle-bars without stopping the machine.

6. In a sewing-machine, the combination with two needle-bars and means connected to one of said bars for operating it, of a coupling device carried by one of said bars and independent of said operating means and serving to connect said bars together when desired, and means for operating said coupling device to connect said bars together or to disconnect one of said bars from the other without stopping the machine.

In testimony whereof I affix my signature in presence of two witnesses.

JOHN KERR.

Witnesses:
JOSEPH L. LACKNER,
E. R. EVERETT.